(12) United States Patent
Iida et al.

(10) Patent No.: US 7,574,384 B2
(45) Date of Patent: Aug. 11, 2009

(54) ORDER MANAGEMENT SYSTEM

(75) Inventors: Koichi Iida, Tokyo (JP); Hidenobu Tanaka, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/516,394

(22) PCT Filed: Jun. 5, 2002

(86) PCT No.: PCT/JP02/05552

§ 371 (c)(1),
(2), (4) Date: Dec. 2, 2004

(87) PCT Pub. No.: WO03/105036

PCT Pub. Date: Dec. 18, 2003

(65) Prior Publication Data

US 2005/0177536 A1    Aug. 11, 2005

(51) Int. Cl.
*G06Q 10/00* (2006.01)
(52) U.S. Cl. ........................................ 705/28
(58) Field of Classification Search .................. 705/35, 705/1, 28; 708/131–132, 134; 434/107, 434/109, 433
See application file for complete search history.

(56) References Cited

U.S. PATENT DOCUMENTS

| | | | |
|---|---|---|---|
| 5,765,143 A * | 6/1998 | Sheldon et al. | 705/28 |
| 6,226,561 B1 * | 5/2001 | Tamaki et al. | 700/100 |
| 6,317,725 B1 * | 11/2001 | Muraoka | 705/28 |
| 7,058,596 B1 * | 6/2006 | Wojcik et al. | 705/26 |
| 2002/0019761 A1 * | 2/2002 | Lidow | 705/10 |
| 2002/0082893 A1 * | 6/2002 | Barts et al. | 705/8 |
| 2003/0050826 A1 * | 3/2003 | Cargille et al. | 705/10 |

FOREIGN PATENT DOCUMENTS

| | | |
|---|---|---|
| JP | 5-246514 | 9/1993 |
| JP | 11-207574 | 8/1999 |
| JP | 2001-14019 | 1/2001 |
| JP | 2001-356812 | 12/2001 |

OTHER PUBLICATIONS

Avraham Shtub's Book Enterprise Resource Planning, The Dynamics of Operations Management, Kulwer Academic Publishers, 1999, pp. 100-112.*

* cited by examiner

*Primary Examiner*—Mary Cheung
*Assistant Examiner*—Brian Fertig
(74) *Attorney, Agent, or Firm*—Squire, Sanders & Dempsey L.L.P.

(57) ABSTRACT

A system capable of managing orders of resources so that order quantities of resources for production of products are properly determined with consideration given to various conditions of a person receiving orders. In this system, according to the latest production plan, placed order quantities are corrected based on corrected required quantities for a plurality of periods in "the first predetermined period" and the placed order quantities are modified so as to suppress a fluctuation in the entire order quantity caused by an order quantity fluctuation in the first predetermined period for a plurality of periods in "the second predetermined period."

6 Claims, 5 Drawing Sheets

FIG. 3 (a)

| DATE | MODEL NO. | PRODUCTION PLAN (NO. OF PRODUCTS) | ACTUAL PRODUCTION (NO. OF PRODUCTS) | BALANCE OF PRODUCTION (NO. OF PRODUCTS) |
|---|---|---|---|---|
| AUGUST 1 | A1 | 30 | 28 | 2 |
|  | B1 | 30 | 30 | 0 |
|  | C1 | 30 | 8 | 22 |
|  | D1 | 30 | 30 | 0 |
| AUGUST 2 | A2 | 30 | 17 | 13 |
|  | B2 | 30 | 0 | 30 |
|  | C2 | 30 | 0 | 30 |
|  | D2 | 30 | 0 | 30 |
| AUGUST 3 | A3 | 30 | 5 | 25 |
|  | B3 | 30 | 0 | 30 |
|  | C3 | 30 | 0 | 30 |
|  | D3 | 30 | 0 | 30 |
| AUGUST 4 | ..... | ..... | ..... | ..... |

FIG. 3 (b)

| DATE | MODEL NO. | PRODUCTION PLAN (NO. OF PRODUCTS) |
|---|---|---|
| AUGUST 2 | A1 | 2 |
|  | C1 | 22 |
|  | A2 | 13 |
|  | B2 | 30 |
|  | C2 | 30 |
|  | D2 | 23 |
| AUGUST 3 | D2 | 7 |
|  | A3 | 25 |
|  | B3 | 30 |
|  | C3 | 30 |
|  | D3 | 30 |
| AUGUST 4 | ..... | ..... |

| ORDER NO. | ORDER QTY. | REQUIRED QTY. | ERROR | MODIFIABLE ? | PERIOD |
|---|---|---|---|---|---|
| 01 | 500 | 310 | +190 | N | 1 |
| 02 | 510 | 300 | +210 | N | 1 |
| 03 | 330 | 330 | 0 | N | 1 |
| 04 | 420 | 480 | −60 | N | 1 |
| 05 | 180 | 520 | −340 | Y | 2 |
| 06 | 270 | 270 | 0 | Y | 2 |
| 07 | 40 | 40 | 0 | Y | 2 |
| 08 | 330 | 330 | 0 | Y | 2 |

FIG. 4(a)

| ORDER NO. | ORDER QTY. | REQUIRED QTY. | ERROR | MODIFIABLE ? | PERIOD |
|---|---|---|---|---|---|
| 01 | 500 | 310 | +190 | Y | 1 |
| 02 | 510 | 300 | +210 | N | 1 |
| 03 | 330 | 1000 | 0 | Y | 1 |
| 04 | 420 | 480 | −60 | N | 1 |
| 05 | 180 | 400 | −340 | Y | 2 |
| 06 | 270 | 270 | 0 | Y | 2 |
| 07 | 40 | 500 | 0 | Y | 2 |
| 08 | 330 | 330 | 0 | Y | 2 |

FIG. 4(b)

| ORDER NO. | ORDER QTY. | REQUIRED QTY. | ERROR | MODIFIABLE ? | PERIOD |
|---|---|---|---|---|---|
| 01 | 310 | 310 | 0 | Y | 1 |
| 02 | 510 | 300 | +210 | N | 1 |
| 03 | 330 | 1000 | −670 | Y | 1 |
| 03 | 670 | 0 | +670 | | 1 |
| 04 | 420 | 480 | −60 | N | 1 |
| 05 | 180 | 400 | −220 | Y | 2 |
| 06 | 270 | 270 | 0 | Y | 2 |
| 07 | 40 | 500 | −460 | Y | 2 |
| 08 | 330 | 330 | 0 | Y | 2 |

FIG. 4(c)

| ORDER NO. | ORDER QTY. | REQUIRED QTY. | ERROR | MODIFIABLE? | PERIOD |
|---|---|---|---|---|---|
| 01 | 310 | 310 | 0 | Y | 1 |
| 02 | 510 | 300 | +210 | N | 1 |
| 03 | 330 | 1000 | −670 | Y | 1 |
| 03′ | 670 | 0 | +670 |  | 1 |
| 04 | 420 | 480 | −60 | N | 1 |
| 05 | 180 | 0 | +180 | Y | 2 |
| 06 | 270 | 0 | +270 | Y | 2 |
| 07 | 40 | 500 | −460 | Y | 2 |
| 08 | 330 | 330 | 0 | Y | 2 |

FIG. 5(a)

| ORDER NO. | ORDER QTY. | REQUIRED QTY. | ERROR | MODIFIABLE? | PERIOD |
|---|---|---|---|---|---|
| 01 | 310 | 310 | 0 | Y | 1 |
| 02 | 510 | 300 | +210 | N | 1 |
| 03 | 330 | 1000 | −670 | Y | 1 |
| 03′ | 670 |  | +670 |  | 1 |
| 04 | 420 | 480 | −60 | N | 1 |
| 05 | 0 | 0 | 0 | Y | 2 |
| 06 | 0 | 0 | 0 | Y | 2 |
| 07 | 500 | 500 | 0 | Y | 2 |
| 08 | 330 | 330 | 0 | Y | 2 |

FIG. 5(b)

| ORDER NO. | ORDER QTY. | REQUIRED QTY. | ERROR | MODIFIABLE? | PERIOD |
|---|---|---|---|---|---|
| 01 | 310 | 310 | 0 | Y | 1 |
| 02 | 510 | 300 | +210 | N | 1 |
| 03 | 330 | 1000 | −670 | Y | 1 |
| 03′ | 670 |  | +670 |  | 1 |
| 04 | 420 | 480 | −60 | N | 1 |
| 05 | 0 | 0 | 0 | Y | 2 |
| 06 | 0 | 0 | 0 | Y | 2 |
| 07 | 350 | 500 | −150 | Y | 2 |
| 08 | 330 | 330 | 0 | Y | 2 |

FIG. 5(c)

ORDER MANAGEMENT SYSTEM

TECHNICAL FIELD

The present invention relates to a system for managing orders of resources for production of products.

BACKGROUND ART

It is important for manufacturers to order resources after determining when, where, and how much resources for production of products should be supplied, because an inappropriate order quantity of resources may cause an oversupply of resources and lead to a shortage of a storage space. Moreover, an inappropriate order quantity of resources may cause an undersupply of resources and lead to a decrease in a production efficiency of products due to a bottleneck in a production line.

Therefore, generally an orderer places an order of resources after determining the order quantity according to a production plan. Unless the actual production meets the production plan, the orderer modifies the order quantity and orders resources according to the modified order quantity.

A person receiving the order, however, has planned to supply resources based on the previous order and therefore cannot fill the latest order modified in some cases. Thereby, it may lead to an oversupply or undersupply of resources.

Therefore, it is an object of the present invention to provide a system capable of managing orders of resources so that the order quantities of resources for production of products are properly determined with consideration given to various conditions of the person receiving the orders.

DISCLOSURE OF THE INVENTION

An order management system of the present invention for achieving the above object, comprises: required quantity determination means for determining required quantities of resources in a plurality of periods; first ordering means for creating first order information in which order quantities in a plurality of periods are the same as required quantities determined by the required quantity determination means and then providing the first order information to an order received management terminal; correction means for correcting the required quantities of resources in the plurality of periods; and second ordering means for creating second order information indicating the latest order quantities obtained by modifying the placed order quantities based on the required quantities corrected by the correction means for a plurality of periods in a first predetermined period and indicating the latest order quantities obtained by modifying the placed order quantities so as to suppress a fluctuation in the entire order quantity caused by an order quantity fluctuation in the first predetermined period for a plurality of periods in a second predetermined period preceded by the first predetermined period and then providing the second order information to the order received management terminal.

According to the present invention, the latest order quantities are determined so that resources based on the latest required quantities can be supplied in the plurality of periods in the first predetermined period. Therefore, just enough resources are ordered in the first predetermined period and thus the manufacturers can secure resources according to the latest order quantities. Consequently, it becomes possible to prevent an oversupply of resources that causes a shortage of a storage space or an undersupply of resources that causes a decrease in a production efficiency of products due to a bottleneck in a production line.

On the other hand, it is expected that a person receiving orders will find it hard to supply resources according to the order quantities in the second predetermined period due to the order quantity fluctuation in the first predetermined period. The latest order quantities, however, are determined for a plurality of periods in the second predetermined period so as to suppress the entire order quantity fluctuation in the plurality of periods in the first and second predetermined periods caused by the order quantity fluctuation in the first predetermined period.

Therefore, even if the person receiving the orders applies resources initially prepared for the plurality of periods in the second predetermined period to the plurality of periods in the first predetermined period, this system reduces a burden in supplying resources according to the latest order quantities in the plurality of periods in the second predetermined period. Consequently, it is possible to ensure supplying resources according to the latest order quantities after the modification also in the plurality of periods in the second predetermined period.

Furthermore, the present invention is characterized in that the required quantity determination means is enable to set required quantities of resources according to a user's intention.

According to the present invention, the latest required quantities are determined according to the user's intention, and therefore the latest order quantities based on the latest required quantities can be caused to reflect various conditions of the person receiving the orders or the like recognized by the user.

Furthermore, the order management system of the present invention is characterized in that the second ordering means creates the second order information indicating the latest order quantities obtained by modifying the placed order quantities in order of precedence from the first period among the plurality of periods in the second predetermined period.

The placed order quantities get unlikely to be modified or suppressed to be modified toward the end of the plurality of periods in the second predetermined period. Therefore, it is possible to reduce a burden imposed on the person receiving the orders caused by the modification of the placed order quantities in the periods close to the end of the second predetermined period.

Still further, the order management system of the present invention comprises production plan creation means for creating production plans of products sequentially, wherein the required quantity determination means determines the latest required quantities of resources based on the latest production plan created by the production plan creation means.

According to the present invention, the system is capable of managing the production plans and the orders of resources according to the production plans collectively.

Furthermore, the order management system of the present invention is characterized in that an upper limit is imposed on a fluctuation in the entire order quantity of resources of the second ordering means.

Furthermore, the order management system of the present invention comprises information acquiring means for acquiring information on a supply capacity of resources of the person receiving the orders from his/her order received management terminal, wherein the second ordering means controls the upper limit on the basis of the information on the supply capacity of resources of the person receiving the orders acquired by the information acquiring means.

According to the present invention, the entire order quantity fluctuation can be caused to reflect various conditions such as a supply capacity of resources of the person receiving the orders.

BRIEF DESCRIPTION OF THE DRAWINGS

FIGS. 2 to 5 are function explanatory diagrams of the order management system according to this embodiment.

BEST MODE FOR CARRYING OUT THE INVENTION

Hereinafter, preferred embodiments of the order management system of the present invention will be described with reference to the accompanying drawings.

Figure 1:
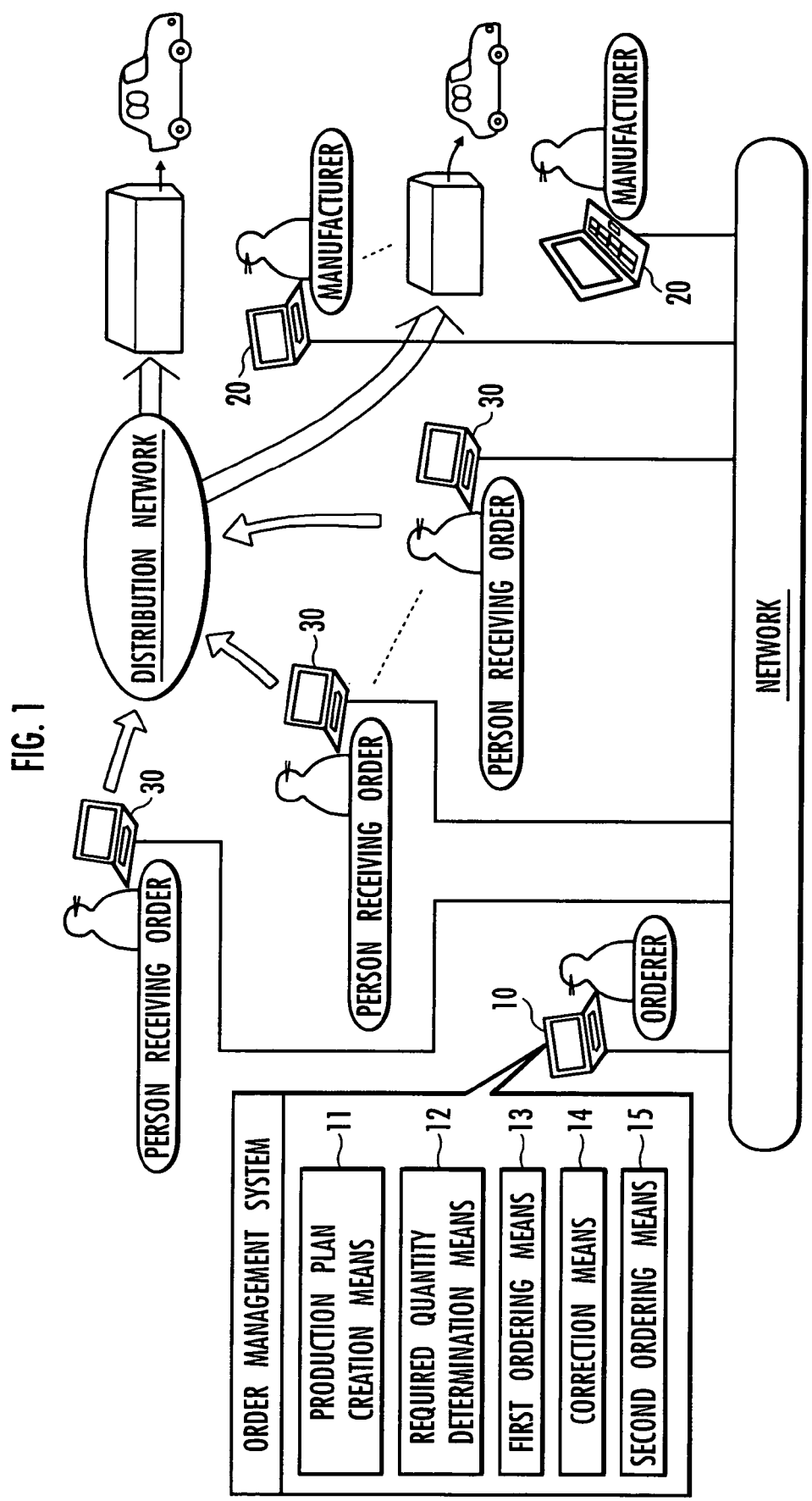
FIG. 1 is a configuration explanatory diagram of an order management system according to this embodiment.

The order management system shown in FIG. 1 comprises an order management terminal 10 for an orderer connected to production management terminals 20 each for a manufacturer of automobiles or other products and to order received management terminals 30 each for a person receiving an order of components of automobiles or other resources, via a network so that they can communicate with each other.

The order management terminal 10 has production plan creation means 11, required quantity determination means 12, first ordering means 13, correction means 14, and second ordering means 15.

The production plan creation means 11 creates production plans for products sequentially.

The required quantity determination means 12 includes a CPU (not shown) executing a given arithmetical operation according to a program stored in a storage device (not shown) and others. The required quantity determination means 12 determines required quantities of resources in a plurality of periods according to a production plan created by the production plan creation means 11. Moreover, the required quantity determination means 12 enables a determination of the latest required quantities according to a user's intention in the order management terminal 10.

The first ordering means 13 creates "first order information" in which order quantities in a plurality of periods are the same as the required quantities determined by the required quantity determination means 12 and then provides the first order information to the order received management terminal 30.

The correction means 14 corrects the required quantities of resources in the plurality of periods according to the latest production plan created by the production plan creation means 11.

The second ordering means 15 creates "second order information" indicating the latest order quantities obtained by modifying "the placed order quantities" based on the required quantities corrected by the correction means 14 for a plurality of periods in "a first predetermined period" and indicating the latest order quantities obtained by modifying the placed order quantities so as to suppress a fluctuation in the entire order quantity caused by the order quantity fluctuation in the first predetermined period for a plurality of periods in "a second predetermined period" preceded by the first predetermined period. Thereafter, the second ordering means 15 provides the second order information to the order received management terminal 30.

Hereinafter, providing data on order information from the first ordering means 13 and the second ordering means 15 to an outside via the network is referred to as "downloading from the order management terminal 10."

The terminals 10 to 30 each have the same components as in a general computer such as an HDD (a storage device), a CPU (a processor), a keyboard and a mouse (input devices), and a monitor.

Functions of the order management system having the aforementioned configuration will be described below with reference to FIG. 2 to FIG. 5.

While the following describes only exchanges of main data, various data in communication protocols or so may be exchanged between the terminals 10 to 30.

Figure 2:
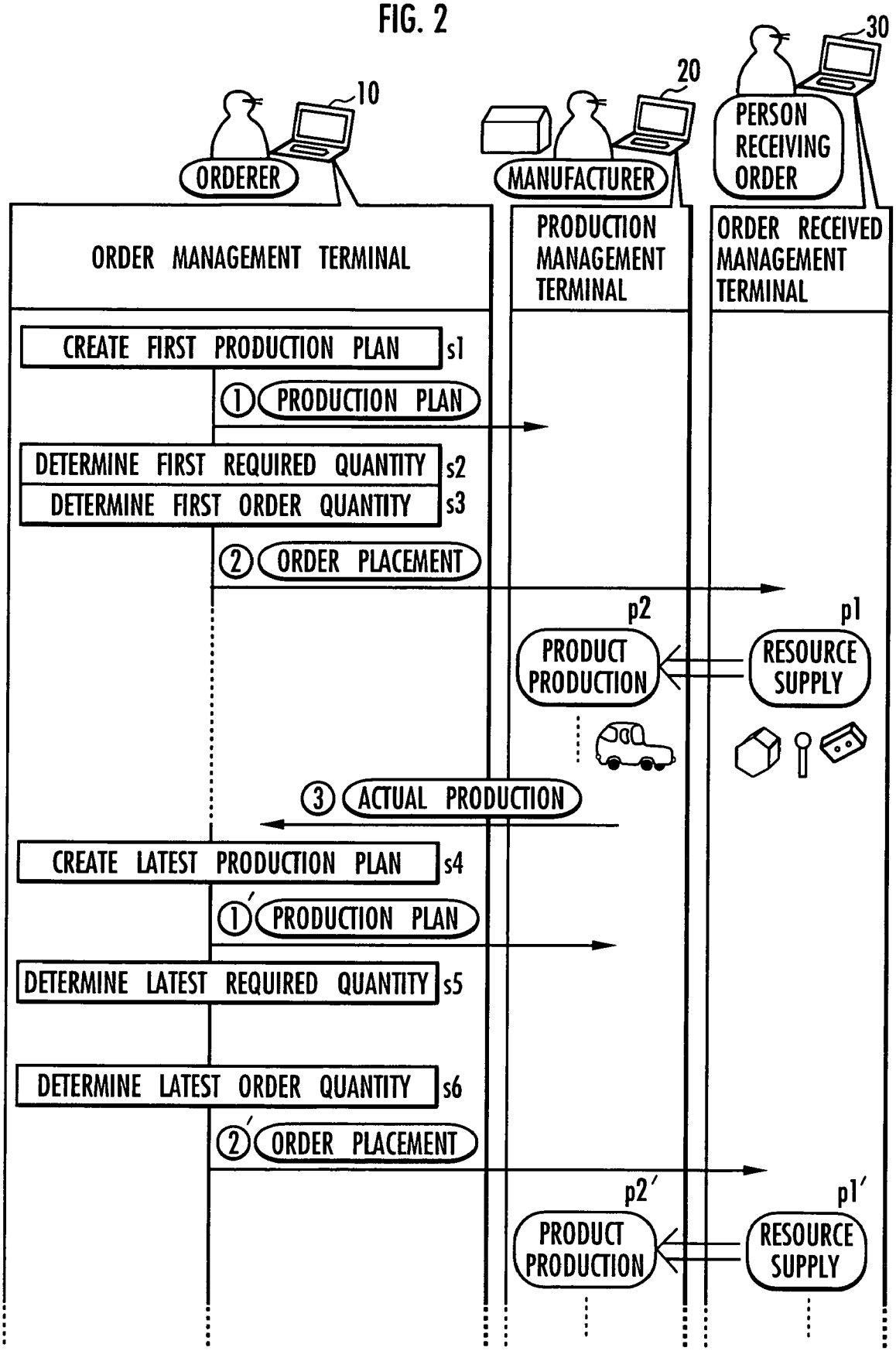

First, the production plan creation means 11 creates a first production plan based on various information about manufacturers uploaded from the production management terminals 20 to the order management terminal 10 (s1 in FIG. 2). This production plan is such as, for example, "producing 30 products each for A1 to D1 on August 1, 30 products each for A2 to D2 on August 2, and so forth," as shown in FIG. 3(a).

At this time, information on the first production plan created by the production plan creation means 12 is downloaded from the order management terminal 10 to the production management terminals 20 (arrow ① in FIG. 2).

Then, the required quantity determination means 12 determines required quantities of resources in a plurality of periods in a certain production plan period for each manufacturer such as, for example, "manufacturer x1 requires—parts m1 by—o'clock on August 1, manufacturer x2 requires—parts m1 by—o'clock on August 1, and so forth" (s2 in FIG. 2).

The first ordering means 13 determines the first required quantities determined by the required quantity determination means 12 directly as the first order quantities (s3 in FIG. 2). Furthermore, "the first order information" on the order quantities for each manufacturer and period is downloaded from the order management terminal 10 to each of the order received management terminals 30 (arrow ② in FIG. 2). The first order information is such as, for example, "—parts m1 are to be supplied to the manufacturer x1 by—o'clock on August 1,—parts m1 are to be supplied to the manufacturer x2 by—o'clock on August 1, and so forth."

Each person receiving the orders (See the arrow ② in FIG. 2) accepts them and supplies resources to the manufacturers (p1 in FIG. 2). The manufacturers produce products by using the resources supplied by the person receiving the orders (p2 in FIG. 2) according to the production plan (See the arrow ① in FIG. 2).

The production management terminals 20 periodically upload information on actual production of the products to the order management terminal 10 daily or on any other predetermined cycle (arrow {circle over (3)} in FIG. 2). In general, actual production of products deviates from an initial production plan due to various conditions of manufacturers. For example, as shown in the left-hand table of FIG. 3, output products A1 and A3 may be two and 22 less than the initial target 30 as of the close of production on August 1. Moreover, as shown in the left-hand table of FIG. 3, the manufacturer may produce 17 products A2 and five products A3 as of the close of production on August 1, though the manufacturer initially planned to produce 30 products each on August 2 and 3.

In these conditions, the production plan creation means 11 creates the latest production plan by modifying the previous production plan on the basis of the information on the actual production (See the arrow ③ in FIG. 2) (s4 in FIG. 2). For example, as shown in the right-hand table of FIG. 3, it creates a new production plan from August 2 on, including a schedule of producing two products A1 and 22 products C1 on August 2 to make up for the shortage of the target production on the previous day and producing 13 products A2 less than the initial target production on August 2 since 17 products A2 have already been produced on the previous day. Moreover, information on the latest production plan is downloaded from the order management terminal 10 to each of the production management terminals 20 (arrow ①' in FIG. 2).

Subsequently, the correction means 14 determines the latest required quantities of resources according to the latest production plan created by the production plan creation means 11 (s5 in FIG. 2). The required quantities can be determined according to a user's intention as described later.

In this regard, if the latest required quantities are determined according to the user's intention, the second ordering means 15 determines the latest order quantities based on the latest required quantities. How the second ordering means 15 determines the order quantities will be described with reference to FIG. 4 and FIG. 5.

The required quantity determination means 12 displays an order management table shown in FIG. 4(a) in the order received management terminal 10. The order management table contains the columns, starting from the left, "an order number" identified by a destination of supplied resources or a period, "an order quantity" of resources, the latest required quantity of resources, "an error" of the order quantity to the required quantity, "modifiable or unmodifiable (represented by "Y" if modifiable or "N" if unmodifiable)" of the order quantity, and "whether the relevant period is included in the first predetermined period or in the second predetermined period (represented by "1" if it is included in the first predetermined period or "2" if it is included in the second predetermined period)."

On the initial order management table, order quantities are unmodifiable in a plurality of periods (order numbers 01 to 04) in "the first predetermined period" and order quantities are modifiable in a plurality of periods (order numbers 05 to 08) in "the second predetermined period."

As shown in FIG. 4(b), the following condition is assumed where the order quantity of the order number 01 is set to "modifiable," the latest required quantity of order number 03 is determined to be "1,000" and its order quantity is set to "modifiable," and the latest required quantities of order numbers 05 and 07 are determined to be "400" and "500" respectively according to a user's intention.

If the latest required quantity (=310) is less than the previous order quantity (=500) in a period in the first predetermined period like the order number 01, the latest order quantity is determined so as to match the latest required quantity as shown in FIG. 4(c).

On the other hand, if the latest required quantity (=1,000) is more than the previous order quantity (=330) in a period in the first predetermined period like the order number 03, a new order (order number 03') in a period in the first predetermined period is added including a required quantity equal to an error (=670) between them, as shown in FIG. 4(c).

Furthermore, errors of the order quantities to the required quantities are displayed regarding the order numbers 01 to 08. For example, errors "−220" and "−460" of the (previous) order quantities "180" and "40" to the required quantities "400" and "500" are displayed regarding the order numbers 05 and 07, respectively.

Subsequently, required quantities in the plurality of periods in "the second predetermined period" are decreased by a quantity corresponding to the order quantity (=670) of the order number 03' added anew, in order of precedence from the first period among them. Specifically, as shown in FIG. 5(a), the required quantity in the first period (the order number 05) among the plurality of periods in the second predetermined period is decreased by a part (=400) of the corresponding quantity (=670) and it becomes "0." Furthermore, the required quantity in the second period (the order number 06) is decreased by the remainder (=270) of the corresponding quantity (=670) and it becomes "0." Unless the decrease in the required quantities in the second predetermined period reaches the corresponding quantity in this stage, a part or all of the required quantity in the subsequent period (the order number 07) is decreased.

Thereafter, as shown in FIG. 5(b), the order quantities are determined so as to match the required quantities regarding the periods in which the order quantity differs from the required quantity (the order numbers 05 to 07) among the plurality of periods in the second predetermined period.

Moreover, as shown in FIG. 5(c), the order quantity in the period (the order number 07) in the second predetermined period is decreased by a quantity corresponding to a summation (=150 (=0+210−670+670−60)) of errors in the plurality of periods (the order numbers 01 to 04 and 03') in the first predetermined period.

Thereby, for the order numbers 01 to 08 whose previous order quantities are 500, 510, 330, 420, 180, 270, 40, and 330 (See FIG. 4(a)), the latest order quantities are determined to be 310, 510, 330, 420, 0, 0, 350, and 330, respectively (See FIG. 5(c), s6 in FIG. 2). Furthermore, the new order (the order number 03') of the order quantity 670 is added in the second predetermined period.

Moreover, "the second order information" about the latest order quantity determined by the order quantity determination means 13 is downloaded from the order management terminal 10 to each of the order received management terminals 30 (arrow ②' in FIG. 2).

Then, each person receiving the order (See the arrow ②' in FIG. 2) accepts it and supplies resources to the manufacturer according to the order quantity in each period (p1' in FIG. 2). The manufacturer produces products by using the resources supplied by the person receiving the order (p2' in FIG. 2) according to the production plan (See the arrow ①' in FIG. 2).

In this system, the latest order quantities are determined so that resources can be supplied according to the latest required quantities in the plurality of periods in the first predetermined period.

Specifically, the required quantity (=310) is determined to be less than the previous order quantity (=500) in the period (the order number 01) in the first predetermined period and the order quantity for the relevant period is decreased by the shortage (=−190) (See the order number 01 in FIG. 5(c)). Furthermore, the required quantity (=1,000) for the period (the order number 03) in the first predetermined period is determined to be more than the previous order quantity (=330) and the order quantity for the relevant period is increased by the excess (=670) (See the order number 03' in FIG. 5(c)). Therefore, this system enables a placement of orders for just enough resources in the plurality of periods in the first predetermined period, and the manufacturers can secure resources according to the latest order quantities.

On the other hand, it is expected that the person receiving the orders will find it hard to supply resources according to the order quantity in the second predetermined period due to the order quantity fluctuation in the first predetermined period. The latest order quantities, however, are determined in the second period so as to suppress the entire order quantity fluctuation in the plurality of periods in the first and second predetermined periods caused by the order quantity fluctuation in the plurality of periods in the first predetermined period.

Specifically, the required quantity (=1,000) is determined so as to be more than the previous order quantity (=330) for the period (the order number 03) in the first predetermined period and the order quantity for the period in the first predetermined period is increased by the excess (=670) (See the order number 03' in FIG. 5(c)). On the other hand, order quantities are decreased for the plurality of periods in the second predetermined period by the excess (See FIGS. 5(a) and 5(b)). Thereby, the entire order quantity fluctuation is reduced to "340" between the previous entire order quantity (=2,580 (See FIG. 4(a)) and the latest entire order quantity (=2,920 (See FIG. 5(c)). Therefore, even if the person receiving the orders applies resources initially prepared for the second predetermined period to the first predetermined period, this system reduces a burden in supplying resources according to the latest order quantities in the plurality of periods in the second predetermined period. Consequently, it is possible to ensure supplying resources according to the latest order quantities after the modification in the plurality of period in the second predetermined period.

Furthermore, if a sum of the order quantities in the first predetermined period exceeds a sum of the required quantities, the sum of the order quantities in the second predetermined period is decreased by the excess (See FIG. 5(c)). This enables ordering resources exceeding the required quantities in the second predetermined period as well as the first predetermined period. Thereby, an oversupply of resources can be prevented.

Moreover, since the latest required quantities can be determined according to a user's intention (See FIG. 4(b)), the latest order quantities based on the latest required quantities can be caused to reflect various conditions of the person receiving the orders or the like recognized by the user.

Furthermore, the second ordering means 15 modifies the placed order quantities in order of precedence from the first period among the plurality of periods in the second predetermined period to obtain the latest order quantities (See 5(a)). Consequently, the placed order quantities get unlikely to be modified or suppressed to be modified toward the end (the order number 08) of the plurality of periods (See the order numbers 05 to 08) in the second predetermined period. Therefore, it is possible to reduce a burden imposed on the person receiving the orders caused by the modification of the placed order quantities in the periods close to the end of the second predetermined period.

While the order management terminal 10 is provided separately from the production management terminal 20 in this embodiment, the order management terminal 10 may be integrated with the production management terminal 20 in an alternative embodiment.

While the production plan creation means 11 creates a production plan based on information uploaded from the production management terminal 20 to the order management terminal 10 in this embodiment, a production plan may be created according to a user's knowledge or the like and then information on the production plan may be input or uploaded to the order management terminal 10 in an alternative embodiment.

While the required quantity determination means 12 is enable to determine the latest order quantities according to a user's intention in the order management terminal (See FIG. 4(b) or the like) in this embodiment, the required quantity determination means 12 may be enable to determine required quantities according to a user's intention in another terminal (not shown) including the production management terminal 20 by downloading an order management program to the terminal in an alternative embodiment. In the alternative embodiment, information on the latest required quantities determined by the relevant terminal is uploaded from the terminal to the order management terminal 10, and the latest order quantities are determined based on the latest required quantities (See s6 in FIG. 2).

While no particular limit is imposed on the fluctuation (=340) from the previous entire order quantity (=2,580 (See FIG. 4(a)) to the latest order quantity (=2,920 (See FIG. 5(c)) in this embodiment, an upper limit may be imposed on the entire order quantity fluctuation in an alternative embodiment.

Moreover, this system may comprise information acquiring means (not shown) for acquiring information on a supply capacity of resources of the person receiving the orders from his/her order received management terminal 30 and the second ordering means 15 may control the upper limit on the basis of the information on the supply capacity of resources of the person receiving the orders acquired by the information acquiring means.

According to the embodiment, various conditions such as a supply capacity of resources of the person receiving the orders can be reflected on the fluctuation in the entire order quantity.

While the plurality of periods for supplying resources are divided into the first and second predetermined periods in this embodiment, the plurality of periods may be divided into three or more periods in an alternative embodiment, such that the plurality of periods included in the first or second predetermined period may be included in subordinate first and second predetermined periods.

The invention claimed is:

1. An order management system embodied on a computer-readable storage medium for managing orders of resources for production of products, the order management system configured to control a computer having an input device and an image displaying device, comprising:

storage means for storing an order management table indicating an order quantity and a required quantity of resources for each period among a plurality of periods;

first ordering means for retrieving the required quantity of resources for each period from the storage means, and transmitting first order information indicating the required quantity of resources for each period directly as an order quantity to an order received management terminal via a network;

required quantity determination means for retrieving, from the storage means, the order management table showing the order quantity of resources for each period indicated as the first order information transmitted by the first ordering means, and for displaying the order management table on the image displaying device;

correction means for correcting the required quantities of resources in one or more periods included in a second predetermined period following a first predetermined period by decreasing the required quantities of resources in the second predetermined period following the first predetermined period when the required quantities of resources in one or more periods included in the first predetermined period are increased by a user's operation of the input device, wherein the decreased amount of the required quantities corresponds with the increased amount of the required quantities; and second ordering means for determining a latest order quantity of resources in each period included in the first predetermined period to equal the required quantity of resources in each period included in the first period, and for determining a latest order quantity of resources in each period included in the second predetermined period to equal to the required quantity of the resources in each period of the second predetermined period corrected by the correction means, and then transmitting a second order information indicating the latest order quantity of resources for each period included in each of the first predetermined period and the second predetermined period to the order received management terminal via a network.

2. The order management system according to claim 1, wherein when the required quantity of resources in the periods included in the first predetermined period indicated by the order management table is decreased by a user's operation of the input device, the second ordering means is configured to modify the order quantity of resources in each period included in each of the first predetermined period and the second predetermined period to equal the required quantity of resources in each period included in each of the first predetermined period and the second predetermined period, and to transmits the second order information to the order received management terminal via a network.

3. The order management system according to claim 1, wherein said second ordering means is configured to modify the placed order quantities to decrease in order of precedence from the first period among the plurality of periods in the second predetermined period.

4. The order management system according to claim 1, further comprising:

production plan creation means for creating production plans of products sequentially, wherein said required quantity determination means is configured to determines the latest required quantities of resources based on a latest production plan created by the production plan creation means.

5. The order management system according to claim 1, wherein the second ordering means is configured to determines the latest order quantity of resources in a way that a fluctuation from an entire last time order quantity of resources in the plurality of periods to an entire latest order quantity is not over an upper limit.

6. The order management system according to claim 5, further comprising:

information acquiring means for acquiring information on a supply capacity of resources of the person receiving the orders from his/her order received management terminal, wherein said second ordering means is configured to controls the upper limit on the basis of the information on the supply capacity of resources of the person receiving the orders acquired by the information acquiring means.

\* \* \* \* \*